United States Patent
Brew et al.

(10) Patent No.: US 11,292,152 B2
(45) Date of Patent: Apr. 5, 2022

(54) EXTRUSION DIES FOR HONEYCOMB BODY

(71) Applicant: Corning Incorporated, Corning, NY (US)

(72) Inventors: Thomas William Brew, Corning, NY (US); Tushar Gulati, Painted Post, NY (US); Lee James Parks, Corning, NY (US); Min Shen, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 581 days.

(21) Appl. No.: 15/776,187

(22) PCT Filed: Nov. 18, 2016

(86) PCT No.: PCT/US2016/062692
§ 371 (c)(1),
(2) Date: May 15, 2018

(87) PCT Pub. No.: WO2017/087758
PCT Pub. Date: May 26, 2017

(65) Prior Publication Data
US 2020/0262103 A1    Aug. 20, 2020

Related U.S. Application Data

(60) Provisional application No. 62/258,137, filed on Nov. 20, 2015.

(51) Int. Cl.
*B29C 48/11*     (2019.01)
*B29C 48/32*     (2019.01)
(Continued)

(52) U.S. Cl.
CPC .............. *B28B 3/269* (2013.01); *B29C 48/11* (2019.02); *B23H 2200/30* (2013.01); *B29C 48/32* (2019.02); *B29L 2031/608* (2013.01)

(58) Field of Classification Search
CPC .................................. B28B 3/269; B28B 3/26
See application file for complete search history.

(56) References Cited

U.S. PATENT DOCUMENTS 4,118,456 A * 10/1978 Blanding ................ B29C 48/11
264/177.12
4,722,819 A *  2/1988 Lundsager .............. B28B 3/269
264/177.11
(Continued)

FOREIGN PATENT DOCUMENTS

CN     104781056 A    7/2015
JP     09-300326 A    11/1997
(Continued)

OTHER PUBLICATIONS

E Ghassemieh, H K Versteeg. "The Effect of Nozzle Geometry on the Flow Characteristics of Small Water Jets—E Ghassemieh, H K Versteeg, M Acar, 2006." SAGE Journals, Sep. 4, 2006, journals.sagepub.com/doi/10.1243/0954406JMES430. (Year: 2006).*
(Continued)

*Primary Examiner* — Kelly M Gambetta
*Assistant Examiner* — Andrés E. Behrens, Jr.
(74) *Attorney, Agent, or Firm* — Kurt R. Denniston

(57) ABSTRACT

An extrusion die (100) for a honeycomb body, the die (100) including: an input surface (102); an opposing output surface (104); feed holes (108) extending from the input surface (102) toward the output surface (104); discharge slots (106) having a slot width (SW) and a slot length (SL), and extending from the output surface (104) toward the input surface (102); and a plenum (130) fluidly connecting the feed holes (108) and the discharge slots (106). The plenum (130) may include chambers (132) connected to the feed holes (108) and including tapered outlets (134) connected to the discharge slots (106). The plenum (133) may include first chambers (132A) connected to the feed holes (108) and
(Continued)

including first tapered outlets (134A), and second chambers (132B) connected to the first outlets and including second tapered outlets (134B) connected to the discharge slots (106).

10 Claims, 5 Drawing Sheets

(51) Int. Cl.
*B28B 3/26* (2006.01)
*B29L 31/60* (2006.01)

(56) References Cited

U.S. PATENT DOCUMENTS

| | | | |
|---|---|---|---|
| 5,876,804 A | 3/1999 | Kodama et al. | |
| 5,997,720 A * | 12/1999 | Brew | B23H 3/00 |
| | | | 205/646 |
| 6,299,813 B1 | 10/2001 | Brew et al. | |
| 6,413,072 B1 | 7/2002 | Brew et al. | |
| 6,558,151 B1 | 5/2003 | Kragle | |
| 6,854,969 B2 * | 2/2005 | Shibagaki | B28B 3/269 |
| | | | 419/67 |
| 6,989,119 B2 | 1/2006 | Bernas et al. | |
| 7,500,847 B2 * | 3/2009 | Takahashi | B28B 3/269 |
| | | | 425/380 |
| 7,713,050 B2 * | 5/2010 | Takahashi | B23P 15/243 |
| | | | 425/380 |
| 8,235,699 B2 * | 8/2012 | Takahashi | B22F 5/007 |
| | | | 425/190 |
| 8,353,695 B2 * | 1/2013 | Takahashi | B23P 15/243 |
| | | | 425/380 |
| 9,616,637 B2 * | 4/2017 | Kitamura | B32B 3/266 |
| 2002/0106418 A1 * | 8/2002 | Fukushima | B23K 26/146 |
| | | | 425/467 |
| 2004/0150133 A1 | 8/2004 | Bernas et al. | |
| 2008/0113858 A1 * | 5/2008 | Kaneko | B28B 3/269 |
| | | | 501/91 |
| 2010/0052205 A1 | 3/2010 | Brew et al. | |
| 2011/0052745 A1 | 3/2011 | Corbett et al. | |
| 2011/0233171 A1 * | 9/2011 | Hayashi | B28B 3/269 |
| | | | 219/69.15 |
| 2014/0060253 A1 | 3/2014 | Brew et al. | |

FOREIGN PATENT DOCUMENTS

| | | |
|---|---|---|
| JP | 03121409 B2 | 12/2000 |
| JP | 2011121081 A | 6/2011 |
| JP | 2015-530292 A | 10/2015 |
| WO | 2013/183613 A1 | 12/2013 |

OTHER PUBLICATIONS

Engineers Edge, LLC. "Fluid Pressure Drop." Pressure Drop Along Pipe Length—Fluid Flow Hydraulic and Pneumatic, Engineers Edge, Sep. 11, 2015, web.archive.org/web/20150911125522/www.engineersedge.com/fluid_flow/pressure_drop/pressure_drop.htm. (Year: 2015).*

Venturi Effect, Wikipedia, Nov. 6, 2015, web.archive.org/web/20151106030923/en.wikipedia.org/wiki/Venturi_effect. (Year: 2015).*

English Translation of JP2018526105 Dispatched Feb. 12, 2020; 4 Pages; Japanese Patent Office.

International Search Report and Written Opinion of the International Searching Authority; PCT/US2016/062692; dated Mar. 9, 2017; 13 Pages; European Patent Office.

* cited by examiner

EXTRUSION DIES FOR HONEYCOMB BODY

CROSS-REFERENCE TO RELATED APPLICATIONS

This application is a national stage application under 35 U.S.C. § 371 of International Patent Application Serial No. PCT/US2016/062692, filed on Nov. 18, 2016, which claims the benefit of priority of U.S. Provisional Application Ser. No. 62/258,137 filed on Nov. 20, 2015 the contents of which are relied upon and incorporated herein by reference in their entireties.

FIELD

Aspects of the present disclosure relate to extrusion dies and methods of using the same.

DISCUSSION OF THE BACKGROUND

Exhaust gas from internal combustion engines is commonly treated using catalysts on honeycomb bodies that have a high degree of internal surface area. These honeycomb bodies are typically manufactured via extrusion.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

SUMMARY

Exemplary embodiments of the present disclosure provide extrusion dies, for example honeycomb extrusion dies, and methods of using the same. Additional features of the invention will be set forth in the description which follows, and in part will be apparent from the description, or may be learned by practice of the invention.

According to various embodiments, provided is an extrusion die having an input surface and an opposing output surface, the extrusion die comprising: a feed hole plate forming the input surface and comprising feed holes extending from the input surface toward the output surface; an array of substantially parallel pins extending from the feed hole plate and forming at least a portion of the output surface; discharge slots at least partially defined by opposing first surfaces of adjacent pins, the discharge slots having a slot width (SW) and a slot length (SL), and extending from the output surface toward the input surface; and interconnected chambers fluidly connecting the feed holes and the discharge slots, the chambers being at least partially defined by opposing second surfaces of adjacent pins and having a chamber width (CW) and a chamber length (CL). A CW/SW ratio ranges from about 3 to about 5, and the slot width SW is about 0.056 mm or less.

According to various embodiments, provided is an extrusion die having an input surface and an opposing output surface, the extrusion die comprising: a feed hole plate forming the input surface and comprising feed holes extending from the input surface toward the output surface; an array of substantially parallel pins extending from the feed hole plate and forming at least a portion of the output surface; discharge slots at least partially defined by opposing first surfaces of adjacent pins, the discharge slots having a slot width (SW) and a slot length (SL), and extending from the output surface toward the input surface; and a plenum fluidly connecting the feed holes and the discharge slots. The plenum comprises: first chambers at least partially defined by opposing second surfaces of adjacent pins, the first chambers extending from the feed holes, the first chambers having a first chamber width (CW1) and a first chamber length (CL1); and second chambers at least partially defined by opposing third surfaces of adjacent pins, the second chambers extending from the first chambers to the discharge slots, the second chambers having a second chamber width (CW2) and a second chamber length (CL2). The first chamber width CW1 is greater than the second chamber width CW2.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention. In the drawings, the size and relative sizes of layers and regions may be exaggerated for clarity. Like reference numerals in the drawings denote like elements.

DETAILED DESCRIPTION

Figure 1A:
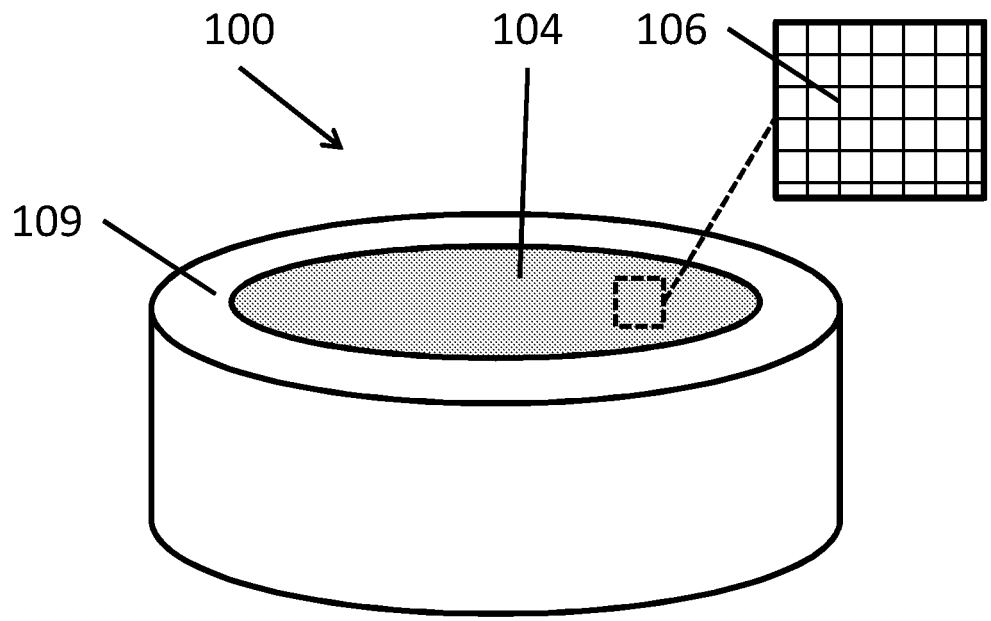
FIG. 1A is a perspective view of an extrusion die according to various embodiments of the present disclosure.

As set forth herein, various aspects of the disclosure are described with reference to the exemplary embodiments and/or the accompanying drawings in which exemplary embodiments of the invention are illustrated. This disclosure may, however, be embodied in many different forms and should not be construed as limited to the exemplary embodiments shown in the drawings or described herein. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It will also be understood that when an element or layer is referred to as being disposed "on" or "connected to" another element or layer, it can be disposed directly on or directly connected to the other element or layer, or intervening elements or layers may be present. In contrast, when an element is referred to as being disposed "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will also be understood that, as used herein the terms "the," "a," or "an," mean "at least one," and should not be limited to "only one" unless explicitly indicated to the contrary. Thus, for example, reference to "a slot" includes examples having two or more slots unless the context clearly indicates otherwise.

Herein, a range encompasses given endpoints of the range and all values between the endpoints. It will be further understood that the endpoints of each of the ranges are significant both in relation to the other endpoint, and independently of the other endpoint. When a measurement is described as being "about" a particular value or a particular range of values, the measurement is intended to encompass machining tolerances, general measurement margins of error, and/or equivalents thereto.

Unless otherwise expressly stated, it is in no way intended that any method set forth herein be construed as requiring that its steps be performed in a specific order. Accordingly, where a method claim does not expressly recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a structure that comprises A+B+C include embodiments where a structure consists of A+B+C and embodiments where a structure consists essentially of A+B+C. Herein, when an element or feature is "fluidly connected" to another element or feature, a fluid in one of the elements or features may flow into the other element or feature.

Honeycomb substrates have been produced for various applications, such as, for automobile catalytic converters. However, automobile emission regulations continue to become more stringent, highlighting the need for catalytic converters having improved properties, such as cold start characteristics. One way to improve cold start characteristics is to reduce the web thickness (e.g., cell wall thickness) of honeycomb substrates. Thinner webs result in reduced thermal mass and increased heat exchange area, which may improve the cold start characteristics of catalytic converters including such honeycomb substrates.

Extrusion die processes for forming honeycomb substrates may experience process constraints, as honeycomb web thicknesses are reduced. For example, producing web thicknesses of below about 0.056 millimeters (mm) (2.2 mil), such as below about 0.045 mm (1.8 mil), or below about 0.038 mm (1.5 mil), may require dies having correspondingly sized extrusion slots. However, extrusion processes using dies having extrusion slots of less than about 0.05 mm (2.0 mil) may require excessively high extrusion pressures (e.g., greater than 2500 psi) and/or may exhibit undesirably low extrusion speeds.

With regard to ultra-thin web substrates and extrusions below 0.05 mm (900/1.5), having reduced pin length can help mitigate the increased extrusion pressure. In the case of dies with slots between 0.05 (2.0 mil) mm and 0.075 mm (3.0 mil), this reduced pin length can be designed to produce a substrate whose web swell is tolerable (20%). Web swell refers to the expansion of extrudate when it exits the die slot resulting in, for example, web walls thicker than the die slot width. However, as the slot widths drop below 0.05 mm, the reduced pin length to manage pressures results in unacceptable web swell requiring the actual slot to make a 0.038 mm web on the order of 0.025 mm. This results in significant pressure and plugging challenges for the extrusion process. Further, such extrusion processes may have extrusion speeds of below about 25.4 mm/sec, due to the pressure imposed on the process by the extrusion die.

Dies according to exemplary embodiments of the present disclosure greatly reduce web swell by managing the slot lengths and introducing a novel stepped slot design that eases the pressure burden of narrower slots but keeps the length to width needed for reduced web swell. The present exemplary embodiments also provide for low batch flow sensitivities, e.g., a low sensitivity to upstream flow disruptions.

The exemplary embodiments of the present disclosure relate to extrusion dies, for example, extrusion dies for ultra-thin web honeycomb substrates. According to various embodiments, the extrusion dies may comprise a feed hole plate comprising feed holes that extend through the feed hole plate, from an input surface of the feed hole plate to an opposing output surface of the feed hole plate; and a pin assembly comprising pins disposed on the output surface of the feed hole plate.

Exemplary embodiments of the extrusion dies, may be more readily appreciated with reference to the exemplary embodiments illustrated in the drawings.

Figure 1B:
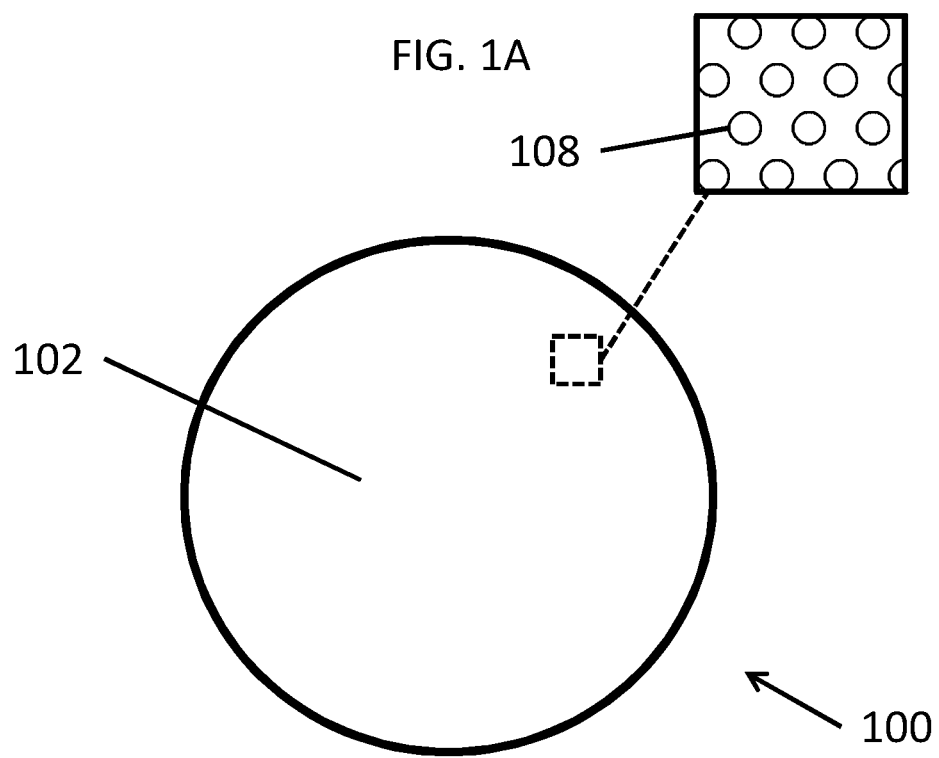
FIG. 1B is a cross-sectional view of an input surface of the die of FIG. 1A.

FIG. 1A is a perspective view of a honeycomb extrusion die 100 according to various embodiments of the present disclosure. FIG. 1B is a plan view of an input surface of the die 100 of FIG. 1A.

Referring to FIGS. 1A and 1B, the extrusion die 100 includes an input surface 102 and an opposing output surface 104. The output surface 104 includes a matrix of discharge slots 106 through which a batch material may be extruded from the die 100. The discharge slots 106 may be formed between pins of the die 100, as discussed in detail below. The batch material may be, for example, a ceramic material used to form a honeycomb body. However, the present disclosure is not limited to any particular type of batch material. The die 100 may also include a mask 109 configured to cover at least a portion of the output surface 104. In particular, the mask 109 may be configured to control the overall shape of an extruded product. While a circular mask 109 is shown, the present disclosure is not limited to any particular mask geometry. The mask 109 may form batch into a skin on a periphery of the matrix of webs. The skin batch may exit the die at a surface upstream from the output surface 104.

The input surface 102 includes one or more feed holes 108 through which the batch material is fed into the die 100. The feed holes 108 may be arranged in any manner, for example a matrix. The feed holes 108 may intersect chambers to feed batch to the discharge slots 106. The feed holes 108 may face discharge slots 106 and/or intersections of the discharge slots 106. In various embodiments, the feed holes 108 may have any suitable geometry, e.g. may be round or non-round. In various embodiments, a non-round feed hole 108, for example a substantially square feed hole 108, substantially square feed hole 108 with rounded corners, a polygonal feed hole 108 with rounded corners, etc., may be chosen. However, the present disclosure is not limited to any particular arrangement or geometry of the feed holes 108.

The extrusion die 100 may be manufactured by cutting a block of metal using wire electro-discharge machining (WEDM), plunge EDM, pulsed electrochemical machining (pECM), ECM, or abrasive wheel slitting (AWS). However, the present disclosure is not limited to any particular manufacturing method.

Figure 2A:
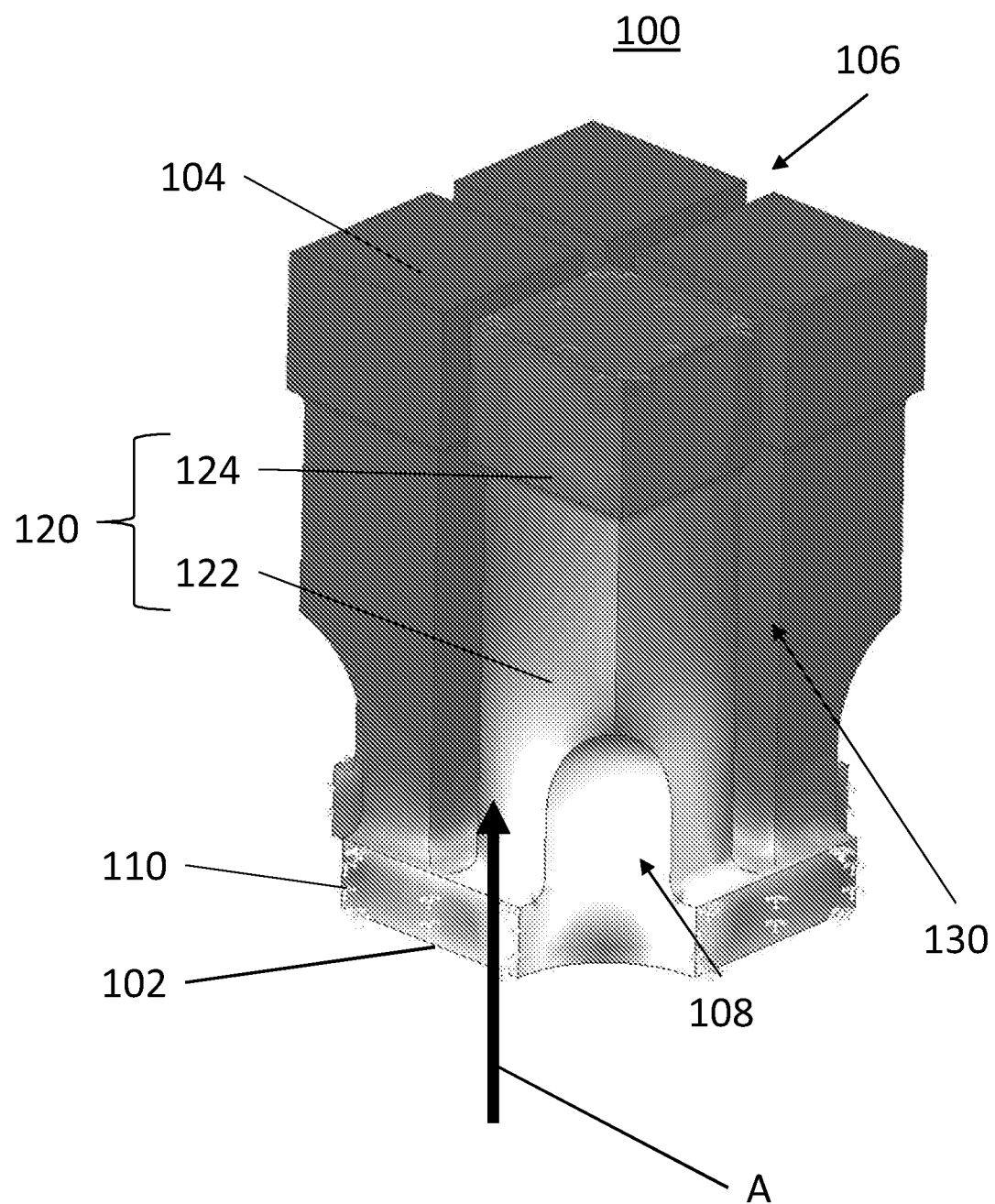
FIG. 2A is a perspective view of a portion of an extrusion die, according to various embodiments of the present disclosure.
Figure 2B:
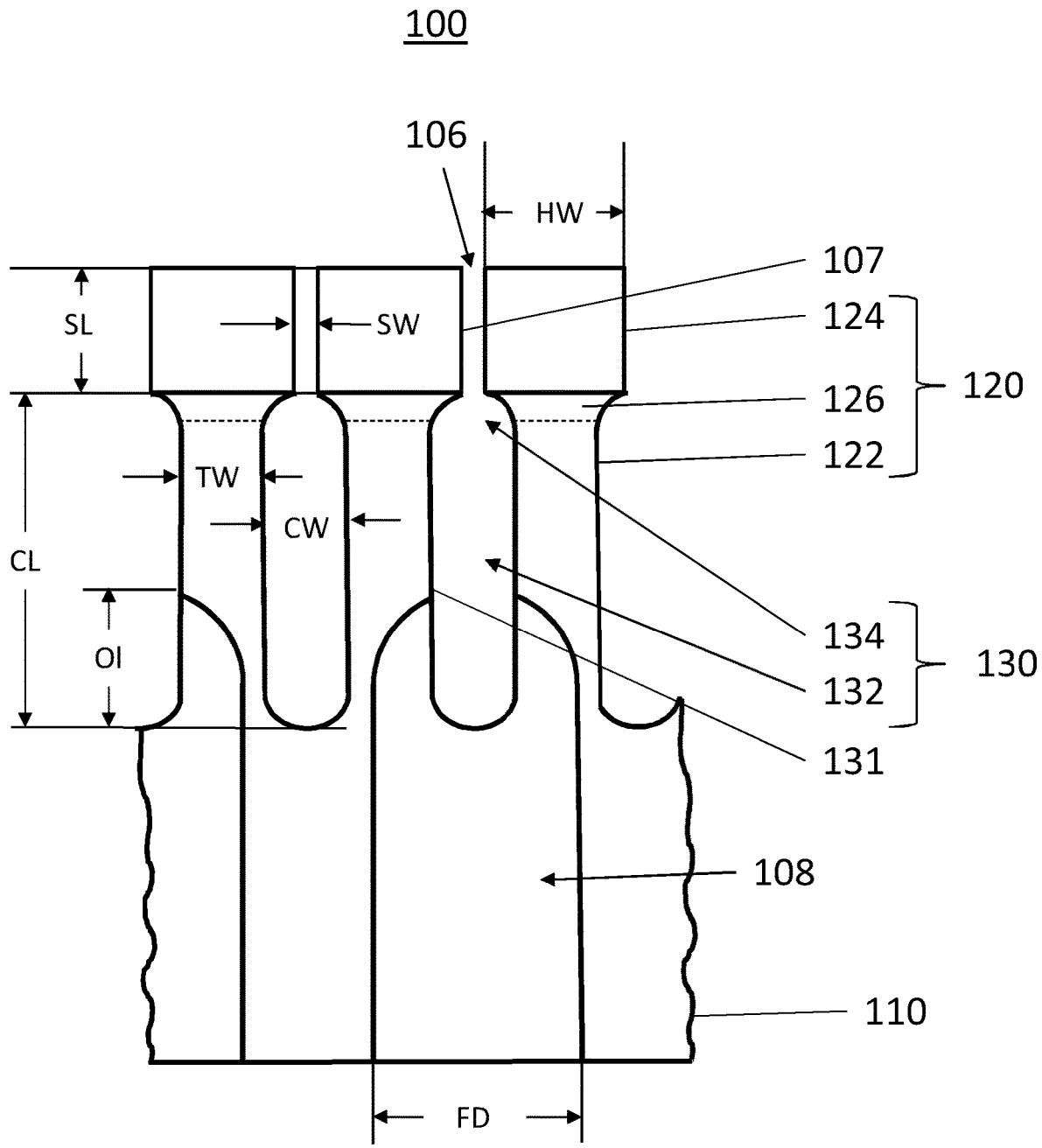
FIG. 2B is a cross-sectional view of the die portion of FIG. 2A.

FIG. 2A illustrates a perspective view of a portion of the die 100 of FIG. 1, according to various embodiments of the present disclosure. FIG. 2B illustrates a cross-sectional view of the die portion of FIG. 2A.

Referring to FIGS. 2A and 2B, the die 100 includes a feed plate 110 and a pins 120 extending from the feed plate 110. The feed plate 110 and the pins 120 may be integrally formed from a single substrate. For example, the die 100 may be formed by wire electro-discharge machining (WEDM), plunge EDM, or abrasive wheel slitting (AWS) a substrate, thereby forming the pins 120 on the feed plate 110. In the alternative, the pins 120 may be separately formed and bonded to the feed plate 110. For example, the pins 120 may be brazed, welded (e.g. electro-welded), or adhered using an adhesive, to the feed plate 110. Once cut, the die 100 may be coated with a wear-resistant material.

The feed plate 110 includes the feed holes 108 and forms the input surface 102 of the die 100. The feed plate 110 and/or the pins 120 may be formed of a material that is sufficient strong enough to resist bowing and/or crowning during the extrusion of a batch material through the die 100. The feed holes 108 may be formed in the feed hole plate 110 by drilling or by direct metal laser sintering, for example. The feed holes 108 may extend through the feed hole plate 110 and into the pins 120. The pins 120 comprise tails 122 disposed on the feedhole plate 110 and heads 124 to define the discharge slots 106. For example, the feed holes 108 may each at least partially extend into one or more of the tails 122. The feed holes 108 may be straight, substantially straight, or worm-like, e.g. variously curved or bent. The feed holes 108 may be rectangular, triangular, polygonal, circular, or the like, in widthwise cross-section.

Herein, the "length" of an element of an extrusion die is taken along a flow direction A of a batch material fed through the die from the input surface 102 to the output surface 104. In addition, the "width" of such an element is taken in a direction substantially orthogonal to the flow direction A and the element may extend in a direction orthogonal to both the length and width thereof, for example, the slots 106 having a width and length can extend along the output surface 104. All dimensions herein are final dimensions (e.g., dimensions after coating, if a coating is applied). In addition, a given dimension may be substantially the same throughout a die, e.g., the dimension may vary within general manufacturing tolerances. For example, all slots of a die may have substantially the same slot width within a machining margin of error. However, in some embodiments, a given dimension may vary in different portions of the die, e.g., may vary within a given range. For example, slots at an edged of a die may have a different width than slots at the center of the die, or slot widths may incrementally change across the face of a die.

According to various embodiments, the feed holes 108 may have a diameter FD ranging from about 0.95 to about 1.20 mm, such as from about 1.00 to about 1.15 mm. The feed holes 107 may have lengths ranging from about 20 to about 25 mm, such as about 21 to about 23. However, the present disclosure is not limited to any particular feed hole dimensions.

The die 100 may optionally include more pins 120 than feed holes 108. For example, according to some embodiments, the die 100 may include from 1 to 2 times as many pins 120 as feed holes 108. In some embodiments, the die 100 may include a ratio of pins 120 to feed holes 108 of 1:1 or 2:1. The pins 120 may optionally be coated, e.g. hard coated, which may provide wear-resistance. By way of non-limiting example, the pins may be coated with titanium aluminum nitride (TiAlN), titanium carbon-nitride (TiCN), titanium nitride (TiN), hard chrome, or with an ultra-high molecular weight (UHMW) plastic material.

The pins 120 may each include a tail 122, a head 124, and a neck 126 disposed between the tail 122 and the head 124. The head 124 may be wider than the tail 122, and the neck 126 may be tapered such that the width of the neck 126 increases from the width of the tail 122 to the width of the head 124.

The head 124 may have generally rectangular width-wise cross-section. However, the present disclosure is not limited to any particular head geometry. For example, the head 124 may be triangular, hexagonal, polygonal, circular, ovoid, or the like, in widthwise cross-section, depending on the cell geometry of a desired extruded product.

The heads 124 may form the output surface of the die 100. The heads 124 can form at least a matrix portion of the output surface 104 of the die 100 and shorter pins and/or feed hole exits may form an output surface, for example, in the skin forming region of the die 100 disposed under the mask 109. The heads 124 may have a head width HW ranging from about 0.50 mm to about 1.40 mm, such as from about 0.75 mm to about 1.25 mm, for example. According to some embodiments, the head width HW may be about 0.90 mm or about 1.00 mm. However, the present disclosure is not limited to any particular head width HW, as the width HW may be adjusted according to the properties of an extruded batch material or the intended structure of an extruded body. The head width HW may be determined according to the desired cell density of an extruded product. For example, the die 100 may comprise pins 120 having heads 124 of various widths and shapes on one die 100. For example, a die may have alternating large and small heads 124 for extruding large and small channels in a honeycomb body. For example, a die may have alternating square and octagonal heads 124 for extruding square and octagonal channels in a honeycomb body. The following Table 1 includes exemplary values for the head width HW and corresponding cell densities of an extruded product.

TABLE 1

| Cell density (cells/in$^2$) | HW (mm) |
| --- | --- |
| 100 | 2.54 |
| 200 | 1.80 |
| 300 | 1.47 |
| 400 | 1.27 |
| 500 | 1.14 |
| 600 | 1.04 |
| 700 | 0.96 |

TABLE 1-continued

| Cell density (cells/in²) | HW (mm) |
|---|---|
| 800 | 0.90 |
| 900 | 0.85 |
| 1000 | 0.80 |

Opposing first surfaces 107 of the pins 120 may at least partially define the discharge slots 106. For example, sidewalls of the heads 124 may at least partially define the discharge slots 106. The discharge slots 106 may have a slot length SL and a slot width SW. The slot length SY may range from about 0.25 mm to about 2.0 mm, such as from about 0.51 mm to about 1.0 mm. When the slot length SL is greater than about 2 mm, extrusion pressures may be unnecessarily increased. When the slot length SL is less that about 0.25, discharge slot plugging, excessive pressure drop, and/or excessive web swelling may occur.

The slot width SW of the discharge slots 106 may be set according to a desired wall thickness of an extruded product. A slot width SW may be less than about 0.051 mm. For example the slot width SW may range from about 0.051 to about 0.025 mm 0.038 mm to about 0.064 mm, such as from about 0.045 mm to about 0.055 mm. However, the slot width SW may be determined according to the desired cell wall thickness of an extruded product.

The discharge slots 106 may have an SL/SW ratio ranging from about 15 to about 30. Accordingly, the discharge slots 106 may have a relatively high aspect ratio, as compared to conventional discharge slots.

The pins 120 may at least partially define a plenum 130. The plenum 130 may fluidly connect the feed holes 180 and the discharge slots 106. In particular, the feed holes 108 may extend into/overlap lengthwise with the plenum 130 (e.g., the feed holes 108 may extend between and/or into/overlap at least some of the pins 120). For example, a feed hole overlap length OL may range from about 1.0 to about 0.5 mm. However, in some embodiments, the feed holes 108 may not extend into the plenum 130.

The plenum 130 may include interconnected chambers 132. Opposing second surfaces 131 of adjacent pins 120 may at least partially define the chambers 132. For example, opposing surfaces of adjacent tails 122 may at least partially define the chambers 132. The chambers 132 may include tapered outlets 134 at least partially defined by opposing surfaces of adjacent pin necks 126. The outlets 134 may be configured to fluidly connect the chambers 132 to corresponding discharge slots 106. According to some embodiments, the chambers 132 may be in the form of a column having tapered or rounded ends. However, the present disclosure is not limited to any particular chamber shape. For example, the chambers 132 may be in the form of polygonal prisms having tapered or rounded ends and/or substantially flat ends. The chambers 132 may have substantially the same size and shape. As such, the plenum 130 may be referred to as a "single stage plenum".

The chambers 132 may have a chamber length CL and a chamber width CW. Herein, the chamber length CL includes both the length of the chamber 132 and its outlet 134, and the chamber width CW may correspond to a maximum width of the chamber 132.

The chamber length CL may range from about 1.6 mm to about 2.1 mm, such as from about 1.7 mm to about 2.0 mm. The chamber width CW may range from about 0.10 mm to about 0.40 mm. A CL/CW ratio may range from about 10 to about 20. A CW/SW ratio may range from about 2 to about 6, such as from about 3 to about 5.

According to various embodiments, some of the dimensions of the die 100 may be set independently of the characteristics of a batch material to be extruded from the die 100. For example, the CW/SW ratio may be set independently of the batch material characteristics.

Some dimensions of the die 100 may be set according to batch material characteristics, such as, yield stress, consistency index, flow index, wall drag coefficient, and/or wall-drag power law index of a batch material. For example, dimensions of the die 100 may be determined according to whether a batch material has a high to medium wall drag coefficient ranging from about 8 to about 18 (psi.(sq./in)$^m$), or a medium to low wall drag coefficient ranging from about 1 to about 8 (psi.(sq./in)$^m$).

For the high to medium wall drag coefficient batch material, the die 100 may have a SL/SW ratio ranging from about 15 to about 20, and a CL/CW ratio ranging from about 10 to about 15. For the medium to low wall drag coefficient batch composition, the die 100 may have a SL/SW ratio ranging from about 20 to about 30, and a CL/CW ratio ranging from about 15 to about 20.

As noted above, CW/SW ratio for either batch composition may range from about 3 to about 5. The relatively high aspect ratios of the chambers 132 and/or exit slots 106 may reduce pressure drop, web swelling, and die sensitivity.

The tapered outlets 134 may be at least partially defined by the necks 126 of adjacent pins 120. As such, the necks 126 of adjacent pins 120 may be configured to decrease the width of a corresponding outlet 134, such that a minimum width of the outlet 134 is substantially the same as the slot width SW of a corresponding slot 106, and a maximum width of the outlet 134 is substantially the same as the chamber width CW of the corresponding chamber 132.

Figure 2C:
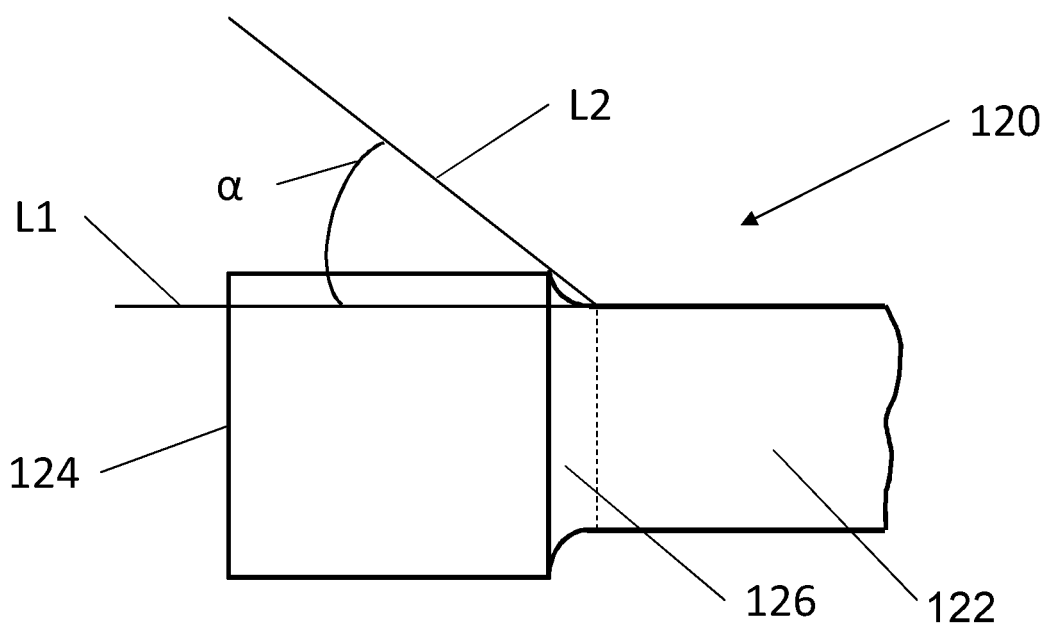
FIG. 2C is a side view of a portion of a pin of FIGS. 2A and 2B.

In particular, outer surface(s) of the neck 126 may be curved. However, according to some embodiments, the outer surface(s) may be substantially flat, e.g., substantially planar or a combination of flat and curved. For example, as shown in FIG. 2C, an outer surface of the neck 126 may be sloped with respect to an adjacent surface of the tail 124, such that an exit angle α, formed between a first line L1 parallel to the adjacent surface of the tail 124 (e.g., parallel to a lengthwise axis of the pin 120A or an adjacent chamber) and a second line L2 (e.g., a secant line) connecting opposing ends the corresponding surface of the neck 126, may range from about 20° to about 45°, such as from about 25° to about 40°, or from about 27° to about 33°.

Figure 2D:
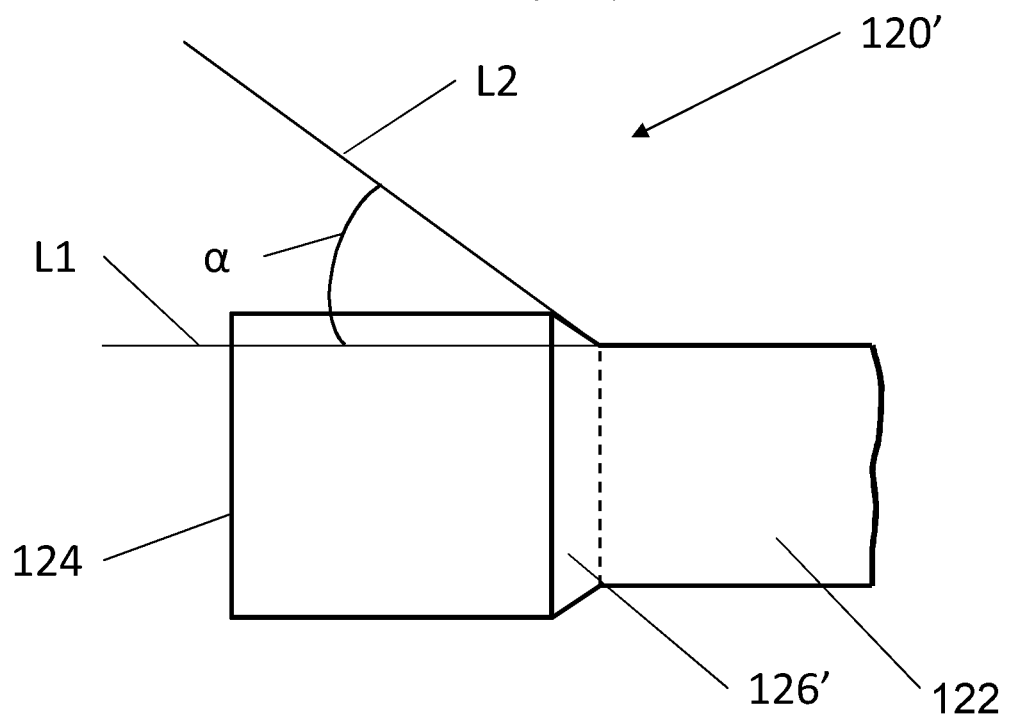
FIG. 2D is a side view of a modified version of the pin of FIG. 2C, according to various embodiments of the present disclosure.

FIG. 2D illustrates a side view of portion of a modified pin 120', according to various embodiments of the present disclosure. The pin 120' is similar to the pin 120, so the differences therebetween will be discussed in detail.

Referring to FIG. 2D, the pin 120' includes a neck 126' that has a substantially flat outer surface, as compared to the curved outer surface of the neck 126. The outer surface of the neck 126' forms an exit angle α, which is formed between a first line parallel to the adjacent surface of the tail 124 (e.g., parallel to a lengthwise axis of the pin 120' or an adjacent chamber) and a second line L2 parallel to the outer surface of the neck 126'. Herein, "substantially flat" refers to a surface that is generally planar or within general machining tolerances of being planar. Herein, "curved" as used with respect to surfaces relates to surfaces having a radius of curvature of greater than zero.

Figure 3:
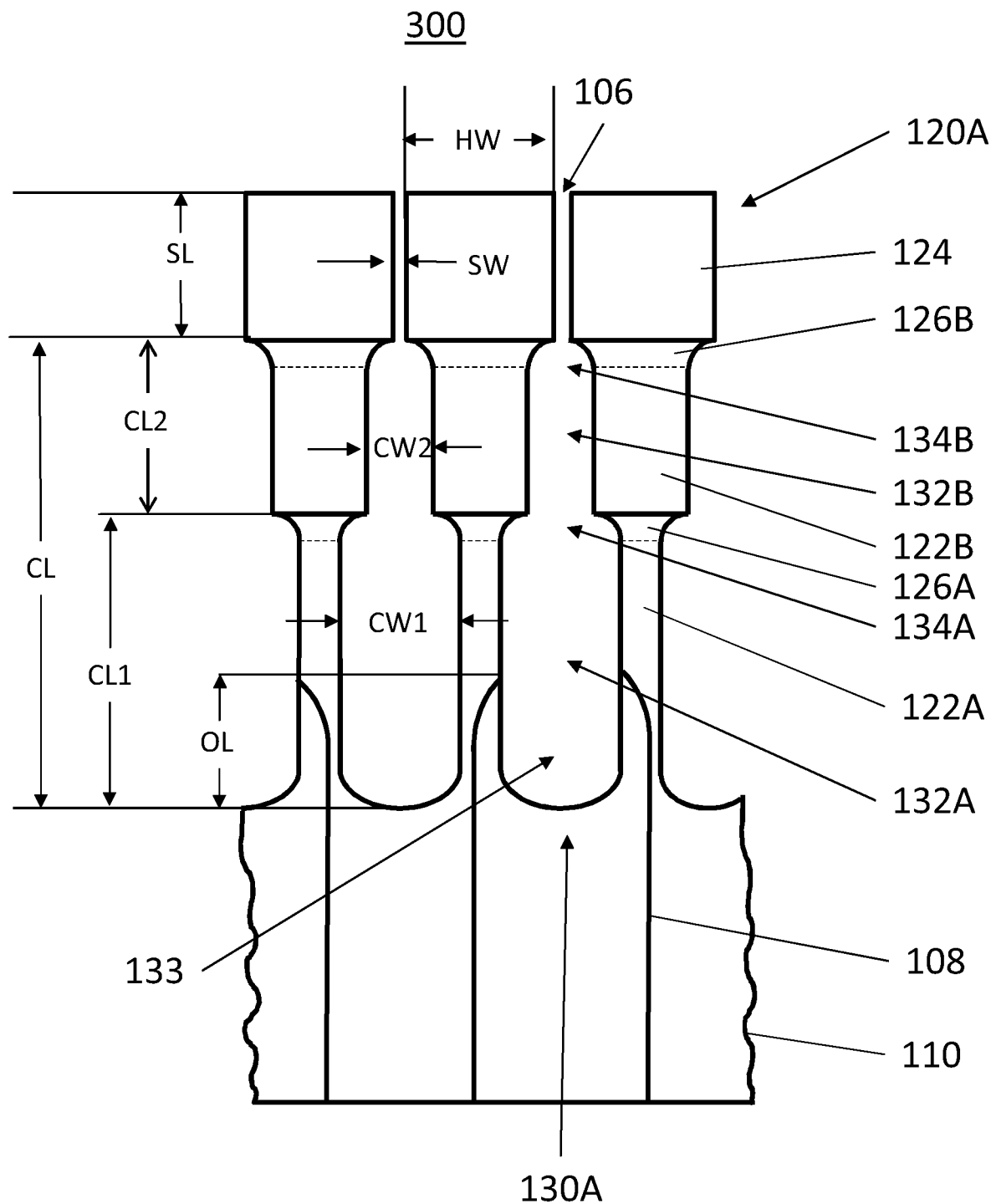
FIG. 3 is a cross-sectional view of portion of an extrusion die, according to various embodiments of the present disclosure.

FIG. 3 is a cross-sectional view of a portion of and extrusion die 300, according to various embodiments of the present disclosure. The die 300 is similar to the die 100, so only the differences therebetween will be discussed in detail. For example, unless otherwise defined, elements and measurements in FIG. 3 may be the same as similar elements and measurements in FIGS. 2A and 2B.

Referring to FIG. 3, in contrast to the die 100, the die 300 includes pins 120A that include a first tail 122A, a second tail 122B, a tapered first neck 126A, a tapered second neck 126B, and a head 124. The first neck 126A is disposed between the first tail 122A and the second tail 122B. The second neck 126B is disposed between the second tail 122B and the heat 124. The head 124 can be wider than the second tail 122B, and the second tail 122B can be wider than the first tail 122A.

Accordingly, the die 300 may include a plenum 133 having first chambers 132A and second chambers 132B that are at least partially defined by respective opposing second and third surfaces of adjacent pins 120A. For example, the first chambers 132A may be at least partially defined by opposing second surfaces that include opposing surfaces of adjacent first tails 122A and first necks 126A, and the second chambers 132B may be at least partially defined by opposing third surfaces that include opposing surfaces of adjacent second tails 122B and second necks 126B. The first chambers 132A may fluidly connect the feed holes 108 and the second chambers 132B (e.g., first chambers 132A may extend from the feed holes 108 to the second chambers 132B). For example, the first chambers 132A may include tapered first outlets 134A that are connected to the second chambers 132B.

The second chambers 132B may fluidly connect the first chambers 132A and the discharge slots 106 (e.g., second chambers 132B may extend from the first chambers 132A to the discharge slots 106). For example, second chambers 132B may include tapered second outlets 134B that are connected to the extrusion slots 106.

The first chambers 132A may have a first chamber width (CW1) and a first chamber length (CL1). The second chambers 132B may have a second chamber width (CW2) and a second chamber length (CL2). According to various embodiments, the first chamber length CL1 may range from about 1.0 mm to about 1.5 mm. The first chamber width CW1 may range from about 0.15 mm to about 0.25 mm.

The second chamber length CL2 may range from about 0.25 mm to about 1.0 mm. The second chamber width CW2 may range from about 0.1 mm to about 0.2 mm. However, the present disclosure is not limited to any particular chamber lengths or widths. The chambers 132A may have substantially the same size and shape and the chambers 132B may have substantially the same size and shape. As such, the plenum 130A may be referred to as a "dual stage plenum".

According to various embodiments, the first chamber length CL1 may be equal to or greater than, the second chamber length CL2. The first chamber width CW1 may be greater than the second chamber width CW2.

A CW1/CW2 ratio may range from about 1.2 to about 1.5. A CW2/SW ratio may range from about 3 to about 5. The CW1/CW2 and CW2/SW ratios may be independent of batch composition characteristics.

Some dimensions of the die 300 may be set according to batch composition characteristics, such as, yield stress, consistency index, flow index, wall drag coefficient, and/or wall-drag power law index of a batch composition. For example, dimensions of the die 300 may be determined according to whether a batch composition has a high to medium wall drag coefficient ranging from about 8 to about 18 $(psi.(sq./in)^m)$, or a medium to low wall drag coefficient ranging from about 1 to about 8 $(psi.(sq./in)^m)$.

For the high to medium wall drag coefficient batch composition, the die 300 may have a SL/SW ratio ranging from about 15 to about 20. A CL1/CW1 ratio may range from about 6 to about 8, and a CL2/CW2 ratio may range from about 2 to about 4.

For the medium to low wall drag coefficient batch composition, the die 300 may have a SL/SW ratio ranging from about 15 to about 20. The die 300 may also have CL1/CW1 ratio ranging from about 8 to about 10, and a CL2/CW2 ratio ranging from about 4 to about 6. As noted above, CW/SW ratio for either batch composition may range from about 3 to about 5. The relatively high aspect ratios of the chambers 132A, 132B may reduce pressure drop, web swelling, and die sensitivity.

Dies having single and dual-stage plenums as discussed above were manufactured and tested by extruding a first batch material (Batch 1) and a second batch material (Batch 2), the characteristics of which are shown in Table 1 below.

TABLE 1

| Property | Symbol | Units | Batch 1 | Batch 2 |
|---|---|---|---|---|
| Yield Stress | $T_y$ | psi | 24 | 17.36 |
| Consistency Index | k | $psi \cdot s^n$ | 5.34 | 5.41 |
| Flow Index | n | — | 0.32 | 0.36 |
| Wall Drag Coefficient | β | $psi \cdot (s/in)^m$ | 9.52 | 12.06 |
| Wall-Drag Power Law Index | m | — | 0.39 | 0.27 |

The results from extruding the Batch 1 and 2 materials to produce honeycomb substrates having a web thickness of less than 0.051 mm, are shown below in Table 2.

TABLE 2

| Design | Pressure drop at 1.0 (inch/sec) | Pressure drop at 2.0 (inch/sec) | Die sensitivity dV % (<2%) |
|---|---|---|---|
| Single Plenum | 1931 (psi) | 2300 (psi) | 1.8% |
| Dual-stage Plenum | 1927 (psi) | 2292 (psi) | 0.86–1.3% |

As can be seen in Table 2, both dies exhibited pressure drops of under 2500 psi for extrusion rates of 1 and 2 inches per second. Further, both dies exhibited die sensitivities of less than 2% and a minimum of web swelling. These results indicate that the configuration of the present dies unexpectedly provided reduced pressure drops, low die sensitivity, and minimal web swelling.

The presently described breakthrough die designs, according to exemplary embodiments of the disclosure, enable extrusion of ultrathin web honeycomb under 0.051 mm with the pressure drop below 2500 (psi) at the extrusion speed between 1.0~4.0 inch/sec (25.4~101.6 mm/sec). The swelling of the web is mitigated by the one or two plenum stages with relative much longer total length than the extrusion slot which pre-squeeze the batch.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An extrusion die having an input surface and an opposing output surface, the extrusion die comprising:
 a feed hole plate forming the input surface and comprising feed holes extending from the input surface toward the output surface;
 an array of substantially parallel pins extending from the feed hole plate and forming at least a portion of the output surface;
 discharge slots at least partially defined by opposing first surfaces of adjacent pins, the discharge slots having a slot width (SW) and a slot length (SL), and arranged in an intersecting honeycomb pattern extending from the output surface toward the input surface; and
 a plenum fluidly connecting the feed holes and the discharge slots, the plenum arranged in the intersecting honeycomb pattern and comprising:
  first chambers at least partially defined by opposing second surfaces of adjacent pins, the first chambers extending from the feed holes, the first chambers having a first chamber width (CW1) and a first chamber length (CL1); and
  second chambers at least partially defined by opposing third surfaces of adjacent pins, the second chambers extending from the first chambers to the discharge slots, the second chambers having a second chamber width (CW2) and a second chamber length (CL2),
 wherein the first chamber width CW1 is greater than the second chamber width CW2.

2. The extrusion die of claim 1, wherein a SL/SW ratio ranges from about 15 to about 30.

3. The extrusion die of claim 1, wherein a CL1/CW1 ratio ranges from about 6 to about 10.

4. The extrusion die of claim 1, wherein a CW2/SW ratio ranges from about 3 to about 5.

5. The extrusion die of claim 1, wherein a CW1/CW2 ratio ranges from about 1.2 to about 1.5.

6. The extrusion die of claim 1, wherein a CL2/CW2 ratio ranges from about 2 to about 6.

7. The extrusion die of claim 1, wherein the slot width SW ranges from about 0.025 mm to about 0.056 mm.

8. The extrusion die of claim 1, wherein:
 the first chambers comprise tapered outlets respectively disposed in fluid communication with the second chambers;
 the second chambers comprise second tapered outlets respectively disposed in fluid communication with the discharge slots; and
 the first outlets and the second outlets form an exit angle ranging from about 20° to about 45°, with respect to a lengthwise axis of the corresponding first and second chambers.

9. The extrusion die of claim 8, wherein the exit angle ranges from about 25° to about 35°.

10. The extrusion die of claim 1, wherein the first chamber length CL1 is greater than or equal to the second chamber length CL2.

* * * * *